Nov. 8, 1966  R. A. BARKER ETAL  3,284,751
RESISTOR IGNITION LEAD
Filed Oct. 11, 1963
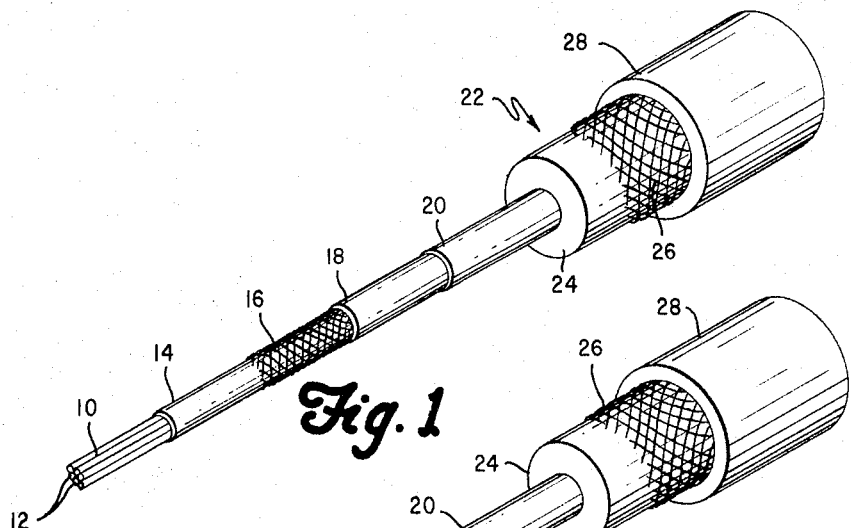
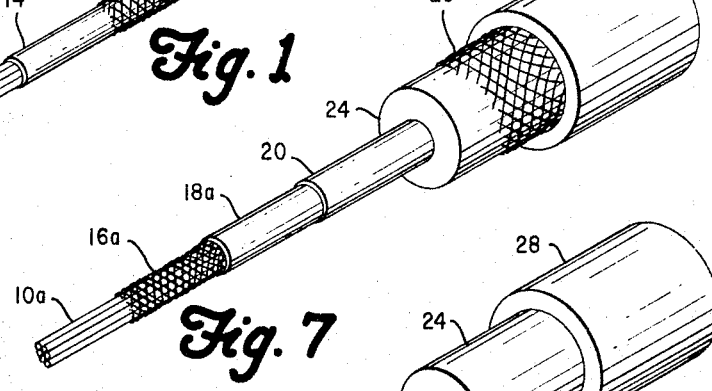
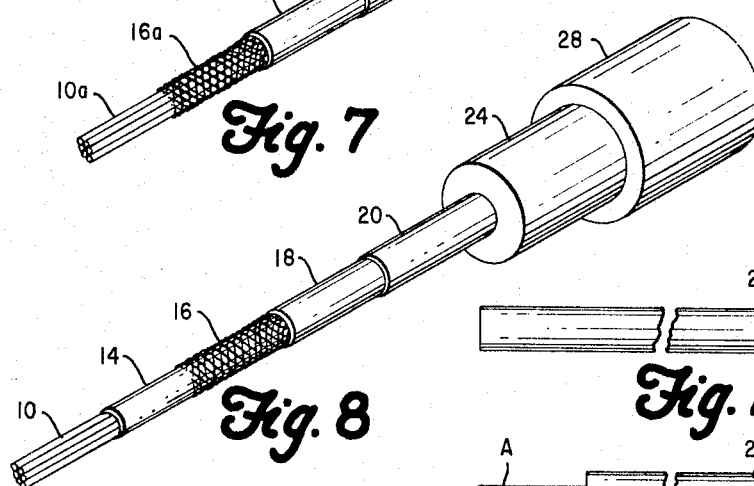
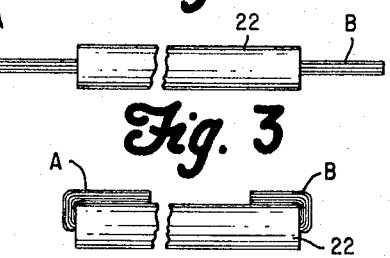
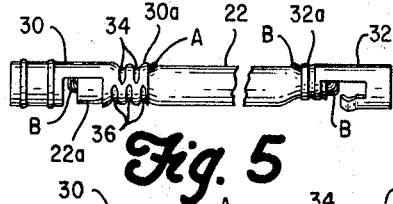
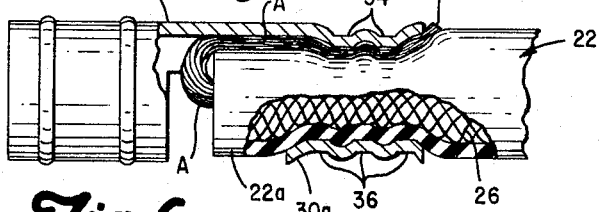
INVENTORS.
ROBERT A. BARKER
JOHN W. SHANK
BY
Souther & Stoltenberg
ATTORNEYS United States Patent Office 3,284,751
Patented Nov. 8, 1966

3,284,751
RESISTOR IGNITION LEAD
Robert A. Barker and John W. Shank, Port Huron, Mich., assignors to Eltra Corporation, Brooklyn, N.Y., a corporation of New York
Filed Oct. 11, 1963, Ser. No. 315,464
1 Claim. (Cl. 338—66)

This invention relates to ignition cables, more particularly to an ignition cable which incorporates a non-metallic conductor having uniformly distributed resistance per unit length of the cable which is provided with a special means for making electrical contact between the non-metallic conductor and metallic terminals which are positioned on each end of the ignition cable.

With the advent in the automotive industry of long-term service warranty agreements wherein the automobile company accepts responsibility for the operability of various parts of the automotive vehicle for a period of time extending to sixty months or to a driving mileage extending to 50,000 miles, it has become very essential that all of the elements of the automotive vehicle and of the ignition system particularly, shall be sufficiently durable to be serviceable through this period of time or over this driving distance. In the past, car companies have found that ignition cables, which have distributed resistance for the suppression of radio and television interfering emanations arising from high frequency oscillations, have been particularly vulnerable to breakdown during the warranty period described hereinbefore so that it has been necessary to replace complete sets of ignition cables to satisfy the conditions of the service warranty. This has been very burdensome and expensive for the automobile vehicle manufacturers, particularly due to the fact that it could not be clearly established whether the breakdown in service within the warranty period arose from the inherent weakness of the ignition cable or whether it arose from careless handling on the part of servicemen attempting to repair the engine.

The present invention contemplates providing an ignition cable which has improved physical and electrical characteristics which will obviate the problems pointed out hereinbefore. The ignition cable incorporating the invention has the inherent durability to satisfy these service requirements under the warranty during normal use of the automotive vehicle, and also has sufficient durability to remain efficient even though it has been subjected to careless handling on the part of a repairman.

The invention further contemplates the provision of a new method of making connection between a non-metallic resistive conductor of an ignition cable to the metallic terminal at the ends thereof by providing a reliable means of making electrical contact to the metallic terminal which has physical and electrical characteristics to remain effective during the warranty period of the automotive vehicle.

It is therefore a principal object of this invention to provide a non-metallic resistive-type ignition cable to suppress radio interference emanations which has the physical and electrical characteristics to be effective for engine operation for automotive vehicles under extended warranty periods.

It is a further object of this invention to provide a means of connecting a non-metallic resistive conductor of an ignition cable which will suppress radio and television interfering emanations due to high frequency oscillations to metallic terminal members which will have the physical and electrical characteristics to satisfy the service requirements of automotive vehicles arising under extended warranty periods, even though the cable is subjected to rough usage by repairmen working on the automotive vehicle.

Other objects and advantages of this invention relating to the arrangement, operation and function of the related elements of the structure, to various details of construction, to combinations of parts and to economies of manufacture will be apparent to those skilled in the art upon consideration of the following description and appended claim, reference being had to the accompanying drawings forming a part of this specification wherein like reference characters designate corresponding parts in the several views.

Referring to the drawings:

FIG. 1 is a perspective view with cut-away portions showing an ignition cable having a resistive non-metallic conductor.

FIG. 2 is an elevational view of a portion of the ignition cable cut to length.

FIG. 3 is an elevational view of the cable portion shown in FIG. 2 with the insulation cut-away at its terminal ends to prepare the non-metallic conductor for connecting to terminals.

FIG. 4 is an elevation view similar to FIG. 3 showing the non-metallic conductor bent back over the insulation at both ends.

FIG. 5 is an elevational view of the ignition cable shown in FIG. 4 with the terminals attached to its ends.

FIG. 6 is a sectional elevation of the terminal shown at the left end of FIG. 5.

FIG. 7 is a perspective view of a modification of the cable shown in FIG. 1.

FIG. 8 is a perspective view of another modification.

The non-metallic conductor 10 provided for the ignition cable shown in FIG. 1 consists of individual thread-like filaments 12 impregnated with conductive material such as graphite. The individual filaments of the conductor 10 may be made of cotton, rayon, linen, Dacron (polyester), or glass, or mixtures of the various filaments as desired. Referring to FIG. 1, the individual threads are preferably unreeled from storage spools and are immersed continuously as unreeled in a colloidal solution of graphite in alcohol so as to completely impregnate the individual fibers of the threads. Upon issuing from the graphite solution, the threads are gathered together in a suitable mechanical means and carried into a suitable drying oven as a group so that they are dried together in contact with each other which deposits the graphite as discrete particles on the threads. The resistance of the final conductor is in part determined by the number of threads which are joined together in the gathering device so that, if a lower resistance is desired in the final cable as used in an ignition circuit, a larger number of the graphite impregnated thread-like filaments are joined together. The subsequent conductor components in combination with the plurality of conductive threads determine total resistance of conductor.

After the group of filaments have been dried in the drying oven, all of the threads as a group are passed through a suitable applicator which applies and impregnates all of the threads with a conducting rubber dissolved in a solvent so as to completely impregnate the whole group of threads. The impregnated coated strands are then conducted from the applicator through a second drying and curing oven which removes the solvents and also vulcanizes or cures the conducting rubber 14 by a thermal action. The amount of conducting rubber must be considered when it is desired to obtain a predetermined resistive value in the final ignition cable. The vulcanizable elastomeric material such as conducting rubber may be formulated with various concentrations of conducting material to provide the predetermined resistive value desired in the final ignition cable.

The rubber coated non-metallic conductor is then passed through a braiding device which applies to the exterior of the conductor an open overbraid 16 somewhat similar to a net which holds the individual threads or filaments together to provide a unitary conductor. The overbraid may be of any desired material such as cotton, rayon, linen, Dacron (polyester), and glass, and is applied to the conductor for the purpose of increasing its strength or resistance to elongation which must also be considered in the selection of the material of which the braid is made. The braid may also be made in a manner to completely enclose the rubber coated conductor element if such is deemed necessary.

After leaving the braider which applies the overbraid 16 to the conductor, the conductor is passed into a suitable applicator which applies a second coating of conducting rubber 18. The conducting rubber is dissolved in a solvent and impregnates and coats both the braid and the underlying conductor. It is then passed through a curing oven to remove the solvents and to cure and vulcanize the conducting rubber. This completes the fabrication of the non-metallic conductor as an element of the ignition cable.

The non-metallic conductor as fabricated by the steps described hereinbefore is then provided with a coating 20 consisting of a colloidal solution of graphite in alcohol after which it is passed through an oven for the purpose of removing the solvent from the coating. This applies to the exterior of the conducting rubber coated conductor an additional layer 20 of conducting material in the form of graphite which also has the further function of allowing a conventional insulating material 22 which is applied thereafter to be readily removed from the non-metallic conductor for the purpose of making suitable electrical connection with a terminal as will be described hereinafter.

The non-metallic conductor coated with the layer of graphite releasing agent 20 is then passed through a tuber which applies an extrusion or coating 24 of insulating material to the exterior thereof which preferably consists of butadiene styrene rubber (SBR type), although any of the normal insulating materials having suitable characteristics may be used. The coated non-metallic conductor is then placed in a vulcanizer or passed through a continuous vulcanizer which utilizes steam at a suitable pressure and temperature for curing or vulcanizing the insulating coating which has been applied. The method and means for applying this coating is well known in the art, and will not be described in further detail.

For the purpose of increasing the strength in the final ignition cable, a second over-braid 26 is applied to the exterior of the insulating coating 24. Preferably, this braid is made from threads or filaments of glass fiber in order to obtain maximum strength, although other materials may be used, such as cotton, rayon, linen, or Dacron. The net or over-braid 26 is applied preferably as an open layer so that portions of the underlying insulating coating 24 are exposed and capable of being contacted by a second outer insulating jacket or coating 28, preferably of neoprene material which is also applied by passing the conductor with the various jackets and over-braid through a tuber and vulcanizing the last applied jacket in the same manner as described hereinbefore with the first insulating coating 24. The neoprene material is preferably used as an outer coating due to its inherent characteristics, such as oil resistance and the like. However, other commonly used jacketing materials such as chlorosulfanated polyethylene, butyl, Buna N and others are suitable. With these steps, the fabrication of the ignition cable is completed, the whole operation being preferably carried out as a continuous one in a mass production line.

The completed cable which is fabricated and reeled in long lengths, is cut to desired lengths, as shown in FIG. 2, preparatory to applying metallic terminals to the ends thereof as shown in FIG. 5. The insulation jackets or coverings 22, consisting of the two outer layers 24 and 28 with the inner-positioned fiber glass net 26 as is best seen in FIG. 1, is cut away to bare the end portions of the non-metallic conductor as shown in FIG. 3. This can be accomplished in any convenient manner using various cutting devices well known in the art. The outer two jackets 22 with the imbedded glass over-braid may be readily removed from the non-metallic conductor, due to the releasing layer 20 of graphite which has been applied to the exterior of the conductor as described hereinbefore. The length of the non-metallic conductor which is bared by removing the insulation 22 depends upon the type of terminal which is to be applied to the ends of the ignition cable.

The bared terminal portions A and B of the non-metallic conductor are then bent back over the insulating portion 22 of the ignition cable, as shown in FIG. 4 and while being held in this position, the terminals 30 and 32 are applied to the ignition cable by placing the clinching portion of the terminals 30a and 32a in embracing relation with the bent-over portions A and B of the non-metallic conductor and the exterior of the insulation of the cable. The terminals are positioned in a manner that a small portion 22a of the cable insulation extends beyond the edge of the terminals. The clinching sections of the terminals are then crimped tightly in position to embrace both the bent-over portions A and B of the non-metallic conductor and the exterior of the cable. The crimping may be brought about in various ways but, preferably, the crimping pressure is concentrated on spaced, non-aligning areas 34 and 36 from the opposite sides of the cable as is best seen in FIG. 6. This causes the terminal to place a heavy compression on all of the elements of the cable including the bent-over portions A and B of the non-metallic conductor and also the over-braids 16 and 26 which are positioned on the non-metallic conductor itself and between the insulating jackets 24 and 28. This enhances the strength of the cable and its resistance to elongation when abnormal stresses are applied to the cable, inasmuch as all of the elements of the cable are anchored solidly together by the clinched terminals by placing the compression upon the cable adjacent its end. The cable then has the combined strength of the central non-metallic conductor with its over-braid, and that of the imbedded over-braid 26 which is positioned between the two insulating coatings.

In FIG. 7, a modification of the cable is shown in which the fiber strands 10a are fabricated from fiber glass, cotton, rayon, linen or polyester or mixtures thereof, and impregnated with conductive material such as graphite. They are then positioned in parallel relation and covered with an open over-braid 16a of cotton, rayon, linen, polyester or glass or mixtures of these various filaments as desired. The over-braid 16a is then coated with conducting rubber in a solvent solution to form a conducting layer 18a which is applied in a manner similar to the step described with reference to the coating 18 of FIG. 1. The conducting coating 18a flows through the over-braid 16a and superficially coats the fiber glass strands 10a of the central core member which is dried and vulcanized as described hereinbefore. After the conducting rubber coating 18a has been vulcanized, the conducting releasing agent in the form of coating 20 is applied as before, and thereafter, the insulating coating 24, the imbedded over-braid 26, and the outer neoprene coating 28 are applied as before described with reference to the modification shown in FIG. 1. This method of fabricating resistance cable is particularly suited for a cable in which the core member is fabricated from fiber glass strands.

In the modification shown in FIG. 8, the central core member 10, with its various layers, is the same as the cable described and shown in FIG. 1, the only difference being that the imbedded reinforcing over-braid 26, which is positioned between the insulating layers 24 and 28, has been omitted.

The attachment of the terminal pieces 30 and 32 to the ends of the cables shown in FIGS. 7 and 8 is identical to that described with reference to the modification shown in FIG. 1. The insulation is cut away to expose the central conductor as shown in FIG. 2, the insulation being removed at the conducting releasing layer 20 in the manner described hereinbefore. Thereafter, the exposed terminating portions A and B are bent back over the outer insulation and the metallic terminal pieces 30 and 32 are applied by crimping as has already been described.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed:

In an ignition cable for use with automotive vehicles having uniformly distributed resistance throughout its length to suppress radio and television interfering emanations therefrom created by high frequency oscillations when a spark discharge occurs, the improvement comprising a flexible resistive conductor of non-conducting fibers coated with conducting material of discrete particles, a conductive rubber coating bonding together the fibers of said conductor, a layer of conducting substance over said rubber coating to act as a release agent for subsequent layers, an insulating rubber layer positioned over the layer of conducting substance, a sheath of braided glass fibers positioned over the rubber layer, and a protective neoprene coating positioned over the said sheath on the exterior thereof and bonded to the rubber layer to form an integral insulating body for the cable.

References Cited by the Examiner
UNITED STATES PATENTS

| | | |
|---|---|---|
| 1,458,803 | 6/1923 | Burley et al. |
| 1,698,704 | 1/1929 | Middleton et al. |
| 2,322,773 | 6/1943 | Peters _____ 338—214 |
| 2,339,147 | 1/1944 | Carlisle et al. _____ 339—223 |
| 2,379,942 | 7/1945 | Webber. |
| 2,397,082 | 3/1946 | Barker. |
| 2,446,387 | 8/1948 | Peterson _____ 338—214 X |
| 2,451,800 | 10/1948 | Buchanan et al. |
| 2,483,428 | 10/1949 | Peters _____ 174—35 |
| 2,563,952 | 8/1951 | Nichol _____ 338—66 X |
| 2,703,356 | 3/1955 | Buchanan et al. _____ 338—214 |

RICHARD M. WOOD, *Primary Examiner.*

H. T. POWELL, W. D. BROOKS, *Assistant Examiners.*